United States Patent
Tadesse et al.

(10) Patent No.: US 11,610,224 B2
(45) Date of Patent: Mar. 21, 2023

(54) ELECTRONIC DISPLAY SYSTEMS

(71) Applicant: International Business Machines Corporation, Armonk, NY (US)

(72) Inventors: Girmaw Abebe Tadesse, Nairobi (KE); Celia Cintas, Nairobi (KE); Sarbajit K. Rakshit, Kolkata (IN); Komminist Weldemariam, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/203,722

(22) Filed: Mar. 16, 2021

(65) Prior Publication Data

US 2022/0301007 A1 Sep. 22, 2022

(51) Int. Cl.
| | |
|---|---|
| *G06Q 30/02* | (2012.01) |
| *G06Q 30/0251* | (2023.01) |
| *G06Q 30/0242* | (2023.01) |
| *G06F 3/14* | (2006.01) |
| *G06Q 30/0272* | (2023.01) |
| *G06Q 30/0273* | (2023.01) |

(52) U.S. Cl.
CPC ....... *G06Q 30/0252* (2013.01); *G06F 3/1423* (2013.01); *G06Q 30/0244* (2013.01); *G06Q 30/0261* (2013.01); *G06Q 30/0272* (2013.01); *G06Q 30/0273* (2013.01)

(58) Field of Classification Search
CPC ........... G06Q 30/0252; G06Q 30/0244; G06Q 30/0261; G06Q 30/0272; G06Q 30/0273; G06Q 30/0207–30/0277; G06F 3/1423
See application file for complete search history.

(56) References Cited

U.S. PATENT DOCUMENTS

| | | | |
|---|---|---|---|
| 9,020,832 B2 * | 4/2015 | Fisher .................. | G06T 7/70 |
| | | | 705/14.1 |
| 9,607,510 B1 * | 3/2017 | DeLorean ............. | G08G 1/02 |
| | | (Continued) | |

FOREIGN PATENT DOCUMENTS

AU 2019200854 A1 * 2/2019

OTHER PUBLICATIONS

Peter Mell and Timothy Grance, The NIST Definition of Cloud Computing, NIST Special Publication 800-145, Sep. 2011, cover, pp. i–iii and 1–3.

*Primary Examiner* — Thuy N Nguyen

(74) *Attorney, Agent, or Firm* — Shimon Benjamin; Otterstedt & Kammer PLLC

(57) ABSTRACT

Members of an audience of a visually dynamic event are clustered using a plurality of sources. A current point of interest (POI) of the visually dynamic event and a future POI of the visually dynamic event are identified across the member clusters. An effectiveness score for given content and a given member cluster is computed for the current point of interest and an effectiveness score for a given content and a given member cluster is computed for the future POI by tracking a position, a speed, and a direction of movement of the current POI. A location of a background area is determined and ranked for each member cluster based on the current point of interest. Electronic displays that correspond to the ranked background areas are identified and ranked. Content is distributed across the electronic displays for each current time period based on the ranked display areas.

20 Claims, 8 Drawing Sheets

(56) References Cited

U.S. PATENT DOCUMENTS

| | | | |
|---|---|---|---|
| 9,852,329 B2 | 12/2017 | Nishikawa et al. | |
| 10,395,274 B2 | 8/2019 | Goyal | |
| 10,701,322 B2* | 6/2020 | DeAngelis | H04N 7/181 |
| 10,708,568 B2 | 7/2020 | Christensen et al. | |
| 10,885,547 B1* | 1/2021 | Gottlieb | G06V 40/173 |
| 11,030,442 B1* | 6/2021 | Bergamo | G06V 10/44 |
| 2002/0030741 A1* | 3/2002 | Broemmelsiek | G01S 5/16 |
| | | | 348/172 |
| 2004/0175019 A1* | 9/2004 | Howard | G06T 7/248 |
| | | | 382/103 |
| 2005/0244033 A1* | 11/2005 | Ekin | H04N 7/181 |
| | | | 382/103 |
| 2006/0197839 A1* | 9/2006 | Senior | H04N 5/247 |
| | | | 348/169 |
| 2007/0279494 A1* | 12/2007 | Aman | H04N 5/278 |
| | | | 348/169 |
| 2010/0050201 A1* | 2/2010 | Kubota | G06Q 30/0273 |
| | | | 705/14.69 |
| 2011/0117934 A1* | 5/2011 | Mate | H04W 24/00 |
| | | | 455/456.3 |
| 2012/0059826 A1* | 3/2012 | Mate | G06F 16/739 |
| | | | 707/E17.089 |
| 2012/0233000 A1* | 9/2012 | Fisher | G06F 16/78 |
| | | | 705/14.71 |
| 2014/0195330 A1* | 7/2014 | Lee | G06Q 30/0242 |
| | | | 705/14.41 |
| 2016/0171532 A1* | 6/2016 | Goyal | G06Q 30/0252 |
| | | | 705/14.5 |
| 2018/0232767 A1* | 8/2018 | Garg | G06Q 30/0261 |
| 2021/0049363 A1* | 2/2021 | Freitas Cunha | H04W 4/029 |

* cited by examiner

ELECTRONIC DISPLAY SYSTEMS

BACKGROUND

The present invention relates to the electrical, electronic and computer arts, and more specifically, to electronic display systems.

Electronic display systems are often used for displaying programming content, advertisements, and the like to large audiences, such as audiences in public gathering places, sports arenas, and similar locations. The display systems utilize, for example, projection technologies and/or light-emitting diode (LED) technologies. While the design of the display may be relatively large, it is often small in relation to the size of the public space. For example, a stadium may contain tens or hundreds of displays, while an audience member may only be able to view one or two displays at a time. Thus, the effectiveness of the display in engaging members of an audience is limited. Moreover, the point of attraction can dynamically change from one point to another point.

SUMMARY

Principles of the invention provide techniques for electronic display systems. In one aspect, an exemplary method includes the operations of clustering members of an audience of a visually dynamic event using a plurality of sources; identifying a current point of interest of the visually dynamic event and a future point of interest of the visually dynamic event across the member clusters; computing an effectiveness score for given content and a given member cluster for the future point of interest by tracking a position, a speed, and a direction of movement of the current point of interest; determining and ranking a location of a background area for each member cluster based on the future point of interest; identifying and ranking one or more electronic display screens that correspond to the ranked background areas; and distributing the given content across the one or more electronic display screens for each time period based on the ranked display areas.

In one aspect, a computer program product for federated learning comprises a computer readable storage medium having program instructions embodied therewith, the program instructions executable by a computer to cause the computer to: cluster members of an audience of a visually dynamic event using a plurality of sources; identify a current point of interest of the visually dynamic event and a future point of interest of the visually dynamic event across the member clusters; compute an effectiveness score for given content and a given member cluster for the future point of interest by tracking a position, a speed, and a direction of movement of the current point of interest; determine and rank a location of a background area for each member cluster based on the future point of interest; identify and rank one or more electronic display screens that correspond to the ranked background areas; and distribute the given content across the one or more electronic display screens for each time period based on the ranked display areas.

In one aspect, an apparatus comprises a memory; and at least one processor, coupled to said memory, and operative to perform operations comprising clustering members of an audience of a visually dynamic event using a plurality of sources; identifying a current point of interest of the visually dynamic event and a future point of interest of the visually dynamic event across the member clusters; computing an effectiveness score for given content and a given member cluster for the future point of interest by tracking a position, a speed, and a direction of movement of the current point of interest; determining and ranking a location of a background area for each member cluster based on the future point of interest; identifying and ranking one or more electronic display screens that correspond to the ranked background areas; and distributing the given content across the one or more electronic display screens for each time period based on the ranked display areas.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated (a non-transitory computer readable medium comprising computer executable instructions which when executed by a computer cause the computer to perform the method steps disclosed). Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one or more of:

a tracker for tracking a viewer's gaze to estimate the location of a visual point of interest (POI; also referred to as a point of attraction and key focus area herein);

tracking of the movement of the POI on a sports activity field;

techniques for improving the technological process of electronically displaying information by dynamically updating content on an electronic display based on changing dynamics of the point of interest;

efficient management of electronic displays;

methods for extrapolating a location of electronic displays in the background of a viewing audience where the viewing probability will be high;

methods for extrapolating areas of electronic displays in the background from various directions where the viewing probability will be high;

methods for providing abiding mechanisms for content based on detected, tracked, and predicted point of interests on a sports activity field; and methods for generating electronic content for a specific POI.

These and other features and advantages of the present invention will become apparent from the following detailed description of illustrative embodiments thereof, which is to be read in connection with the accompanying drawings.

DETAILED DESCRIPTION

Figure 1:
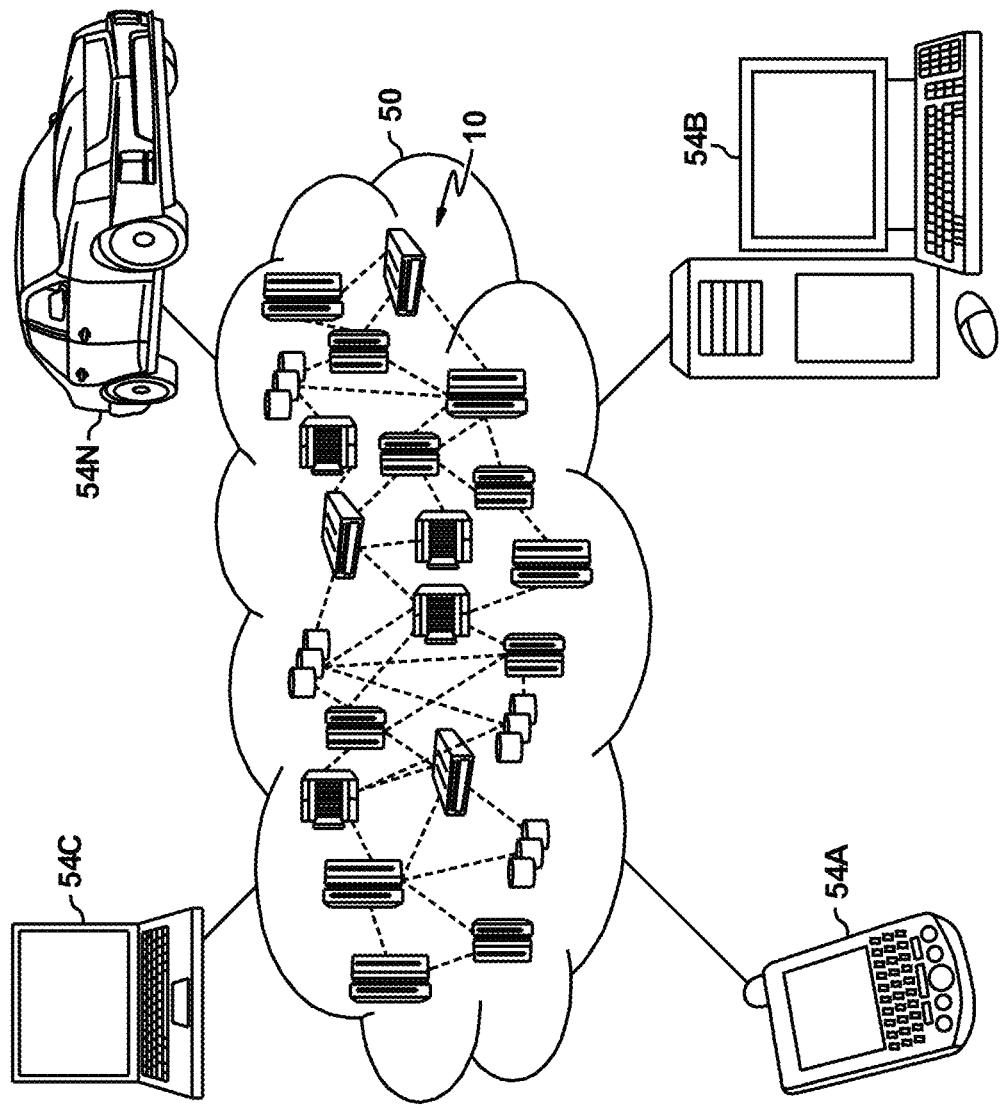
FIG. 1 depicts a cloud computing environment according to an embodiment of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
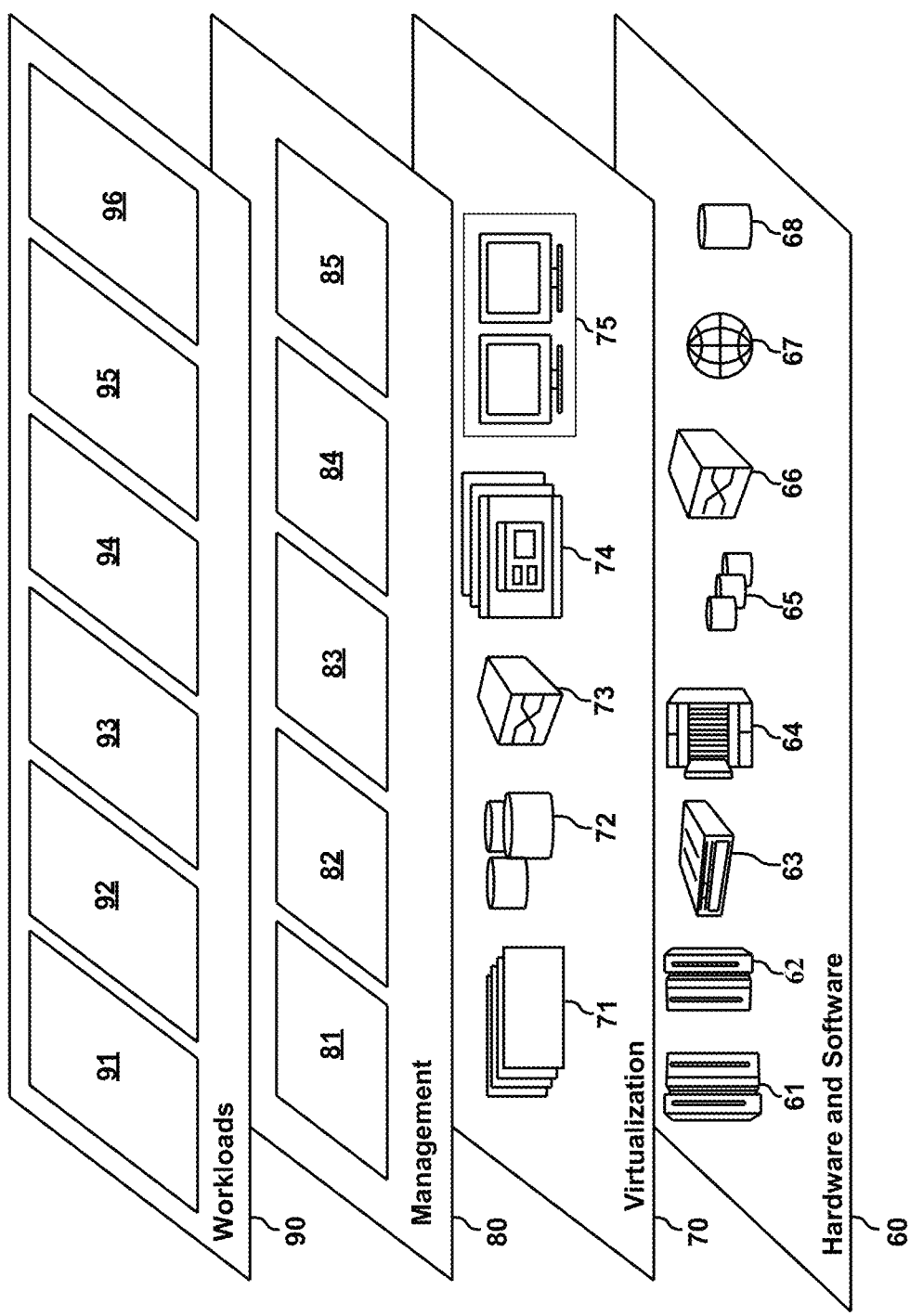
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and electronic display controller 96. In some embodiments, for example, resource-intensive aspects could be cloud-implemented; e.g., video-based processing, tracking and clustering of the trajectory of key focus areas, and electronic content generation.

Generally, an electronic display system (EDS) and associated methods are disclosed. In one example embodiment, the electronic display system tracks a viewer's gaze to estimate the visual point of interest (POI) of the viewer; tracks the movement of the POI over time; dynamically updates content on an electronic display based on the changing dynamics of the point of interest; and electronic content generation. In one or more embodiments, the EDS is configured to simultaneously manage multiple display screens. One or more embodiments provide for the efficient management of electronic displays.

In one example embodiment, an electronic display system identifies locations for advertisements (referred to as "ads" herein) based on a detected, tracked and/or predicted point(s) of interest. Techniques are also disclosed for determining and/or predicting an advertisement's effectiveness with respect to a given point of interest. In one example embodiment, the display of content is controlled and managed based, for example, on a probability of the displayed digital content, such as an advertisement, being viewed by members of an audience. The position, speed and direction of a movement of a key focus area(s) (such as the area of a sports field in a stadium that is the focus of attention of the spectators) are predicted in near real-time, the area(s) of an electronic display(s) that are in the background of the key focus area(s) from the perspective of one or more members of the audience are extrapolated, and digital content is proactively displayed in the extrapolated area(s).

In one example embodiment, real-time bidding is conducted to auction different areas of the display screen of the EDS (for a specified period of time) to bidders looking to display their content, such as advertisements. Bidders submit bids to display content on the electronic displays that are located in the background of the POI (in relation to an audience member, a broadcast camera, and the like). Areas of the display screen(s) of the EDS that have a higher probability of being viewed may be auctioned for a higher cost than areas of the display screen(s) of the EDS that have a lower probability of being viewed. In one example embodiment, advertisements of the winning bidders are positioned on display screens based on the winning bids. In another aspect, the criteria for bidding is a combination of one or more of the following factors: path of the predicted movement of the key focus area of the game (based on historical learning), predicted viewing duration, the time of the display, the location of the electronic display, the display area on the electronic display, a size of the audience in a portion of the stadium who can view the electronic display, a prediction of a game changing situation (such as a player/team is about to score a goal vs. a player is just taking the ball), and an effectiveness of displaying an ad for those specified constraints. For example, if a goal is about to be scored, then the displayed ad will likely appear in many photographs taken by members of the audience, potentially leading to future viewing of the ad. The disclosed techniques provide for the identification of locations and timing for displaying advertisements based on detected, tracked and/or predicted points of interest; and techniques for determining or predicting an advertisement's effectiveness with respect to a given point of interest.

Figure 3A:
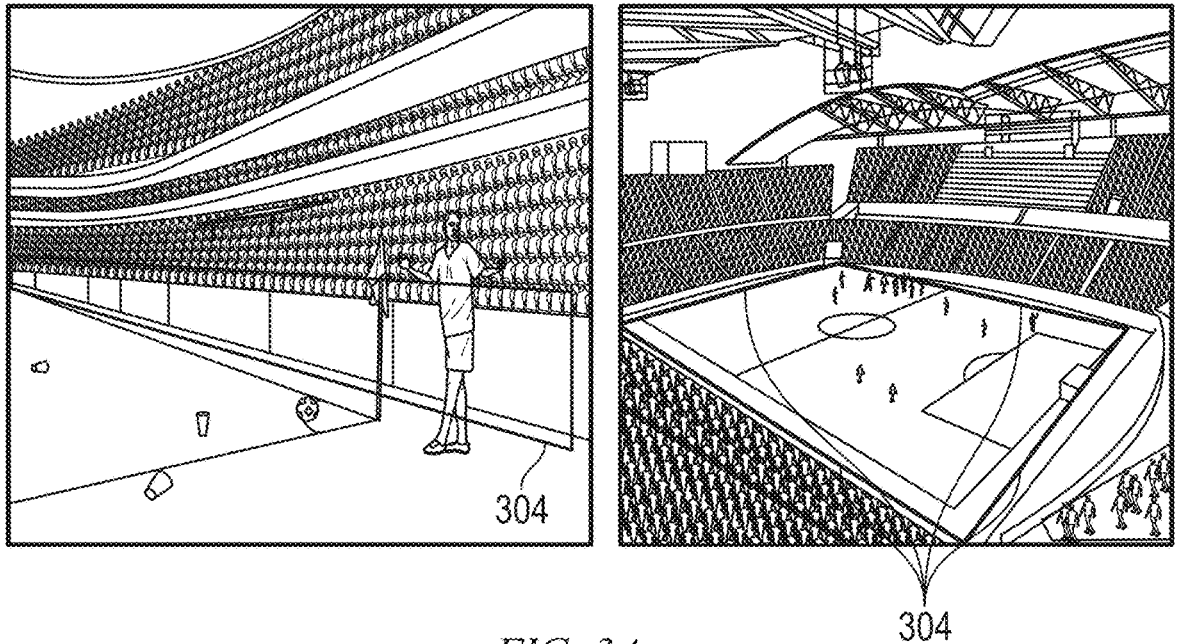
FIG. 3A illustrates the display of content on electronic display screens around an arena. LED and other type display screens (such as projection screens) are typically located around the periphery of a playing field and are used to display ads and other content.

FIG. 3A illustrates the display of content on electronic display screens around an arena. LED and other type display screens (such as projection screens) are typically located around the periphery 304 of a playing field and are used to display ads and other content. Conventionally, ads are electronically displayed around the circumference of an arena during various events, such as sports events.

Figure 3B:
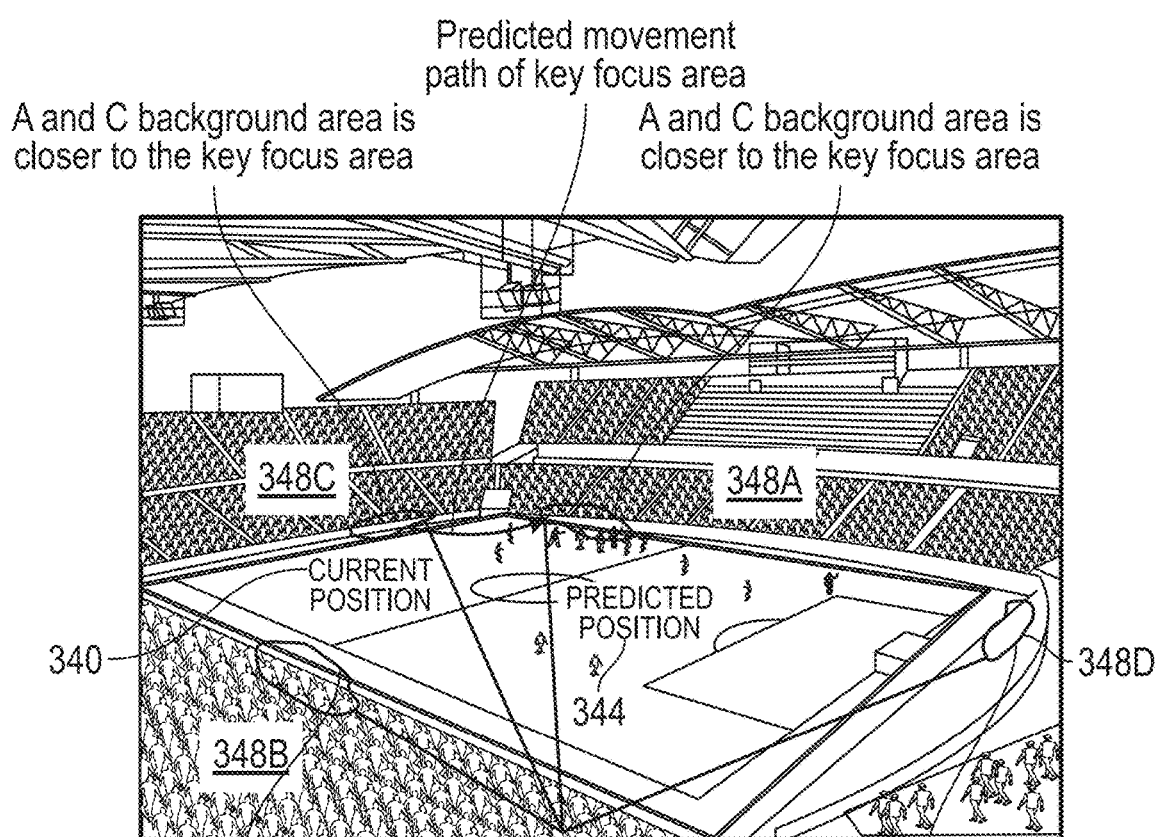
FIG. 3B illustrates the predicted movement of a key focus area, display of content on electronic display screens around an arena in relation to a point of interest and the proximity of the display unit to the key focus area, in accordance with an example embodiment.

FIG. 3B illustrates the predicted movement of a key focus area, the display of content on electronic display screens around an arena in relation to a point of interest and the proximity of the display unit to the key focus area, in accordance with an example embodiment. A current position of a point of interest 340 is predicted to move towards a predicted point of interest 344. Background areas 348A and 348C are closer to both the current point of interest 340 and the predicted point of interest 344 than the background areas 348B and 348D. Based on the position of the viewers and the broadcast cameras with respect to the POI, the most relevant background areas (such as background areas 348A and 348C, which are likely to be viewed by the audience members, the cameras, or both) are determined and used to display content with a higher likelihood of being viewed.

During most sporting events, the point of interest is often rapidly changing. For example, during a soccer game, the ball may rapidly move from one corner of the field to another. Accordingly, as the point of visual interest changes, the focus of people in the stadium changes along with the movement of the point of interest. As the point of interest changes, the attention delivered to a given display screen in the background will change and its visibility to viewers in attendance as well as those that are watching live (or later on recorded video) will change.

The effectiveness of an advertisement depends, for example, on how many people are viewing the ad and the length of time that the ad is being viewed by individual viewers, a cluster of viewers, or all viewers. In a stadium, the position of a viewer's focus is changing from time to time, if not continuously. The screen in the background of the key focus area from the perspective of the audience (such as a ball, a player, or other key focus object) will have an increased chance of being viewed compared to display screens in other areas of the stadium. Thus, displaying advertisements in the background of the key focus area will have a correspondingly higher viewing rate and corresponding higher advertising effectiveness. Moreover, proactively displaying the advertisement in the background so that, when the key focus area moves, the advertisement is displayed in the background of the POI improves the effectiveness of the electronic display and corresponding management system.

Figure 3C:
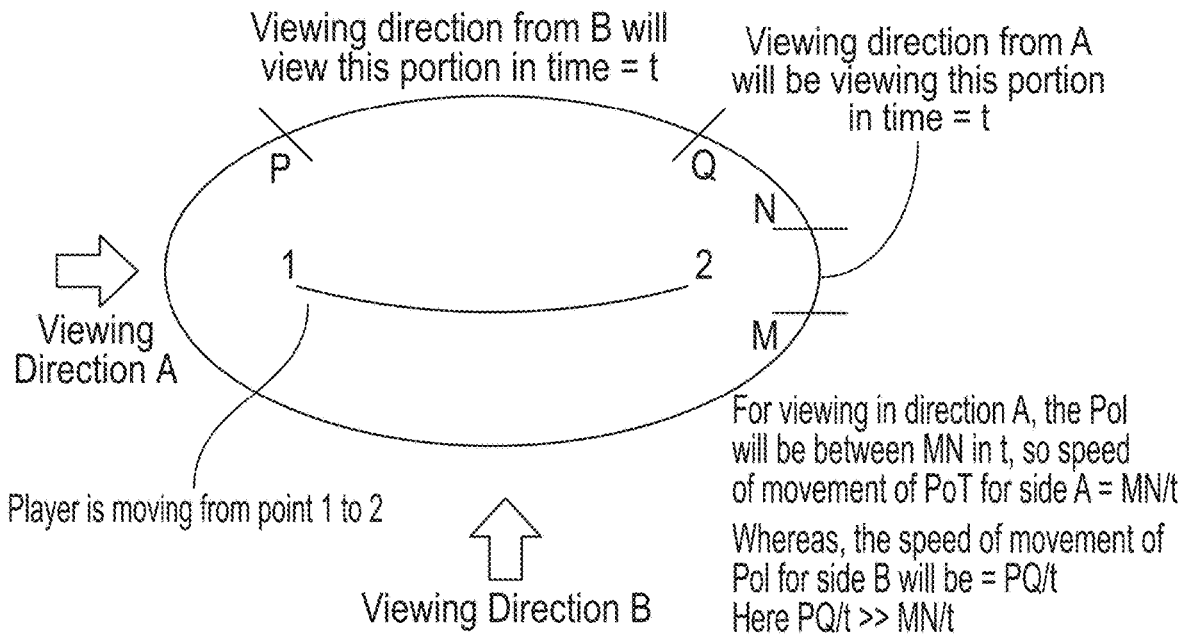
FIG. 3C illustrates an example of the movement of a key focus area, in accordance with an example embodiment.
Figure 3D:
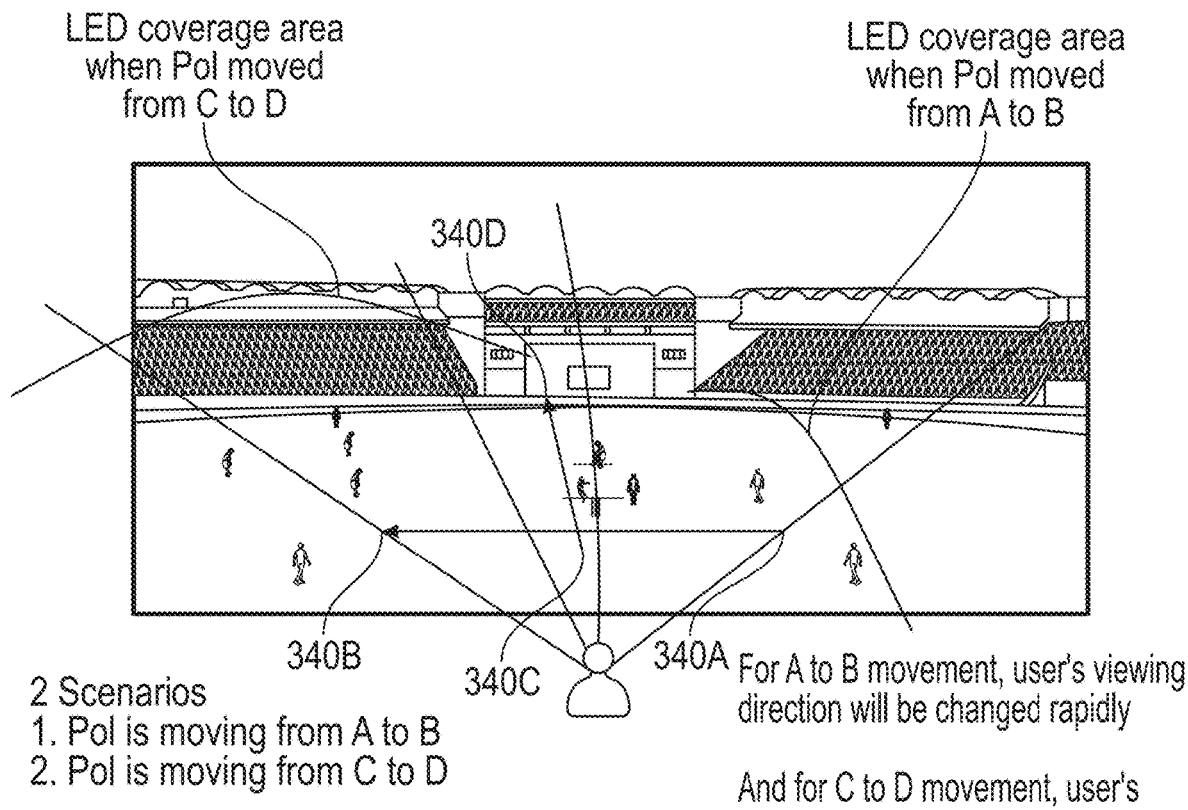
FIG. 3D illustrates an example of the change of the user's viewing direction based on the movement of the key focus area, in accordance with an example embodiment.

FIG. 3C illustrates an example of the movement of a key focus area, in accordance with an example embodiment. FIG. 3D illustrates an example of the change of the user's viewing direction based on the movement of the key focus area, in accordance with an example embodiment. Based on an identification of a point of attraction (such as a player, a referee, a ball, and the like), a video analysis engine identifies a path, direction and speed of the point of attraction. Based on the movement pattern of the point of attraction and the projected key focus area, the area of the stadium with viewership of a longer duration is identified, and areas of the electronic displays are classified based on duration of view and the areas of the facility where the corresponding display can be viewed. The advertisement is identified based on the movement pattern of the player, the area of the electronic display where the ad will be shown and, based on the speed of movement of the player, the appropriate ad is displayed. For example, as a player is moving from Point A to Point B, the background display is AB for one side of the arena and the background display is CD for another side of the arena. In the case where the POI is moving very fast from Point A 340A to Point B 340B and, a static advertisement can be shown in the AB area. Since the field of view of AB is greater than the field of view of CD, during the same time duration, a smaller area will be visible during a scan of the field of view encompassing CD than a scan of the field of view encompassing AB; thus, a static ad is displayed in the field of view of AB and a video ad is displayed in the field of view of CD.

In any stadium, the point of attraction is dynamically changing from one point to another. The relative speed of movement of the POI will depend on the direction of viewing and the direction of movement of the POI; from one viewing direction, the POI speed may be greater and, from another viewing direction, the POI speed may be less. If the speed of the POI from a given viewing direction is more than a threshold limit, then a video-based ad is shown whereas, if the speed of the POI is less than the threshold limit, an image-based ad can be displayed. In one example embodiment, the point of interest is detected and tracked, and its future location is predicted over time. The position for content, such as advertisements, is defined based on the detected, tracked, and predicted point(s) of interest in, for example, a sports arena. The content to be displayed is dynamically updated based on the constantly changing dynamics of the point of interest. In one example embodiment, higher priority content is displayed when the display screen is in the background of a POI and lower priority content is displayed when the display screen is not in the background of a POI.

In one example embodiment, the prediction of the POI includes the position, speed and direction of movement of the key focus area(s), and the determination of the location of content includes extrapolating the background of the POI from various viewing directions (locations where the viewing probability will be high) and identifying the display screen(s) or areas of the display screen(s) that will reside in the background area.

In one example embodiment, the disclosed techniques enable real-time, smart contract-enabled bidding for the use of a display screen, for example, a display screen or an area of a display screen that is located where the viewing will be relatively high. As such, advertisements can be displayed on the display areas where the effectiveness of the ads will be high.

Smart Contract Rule

Figure 4:
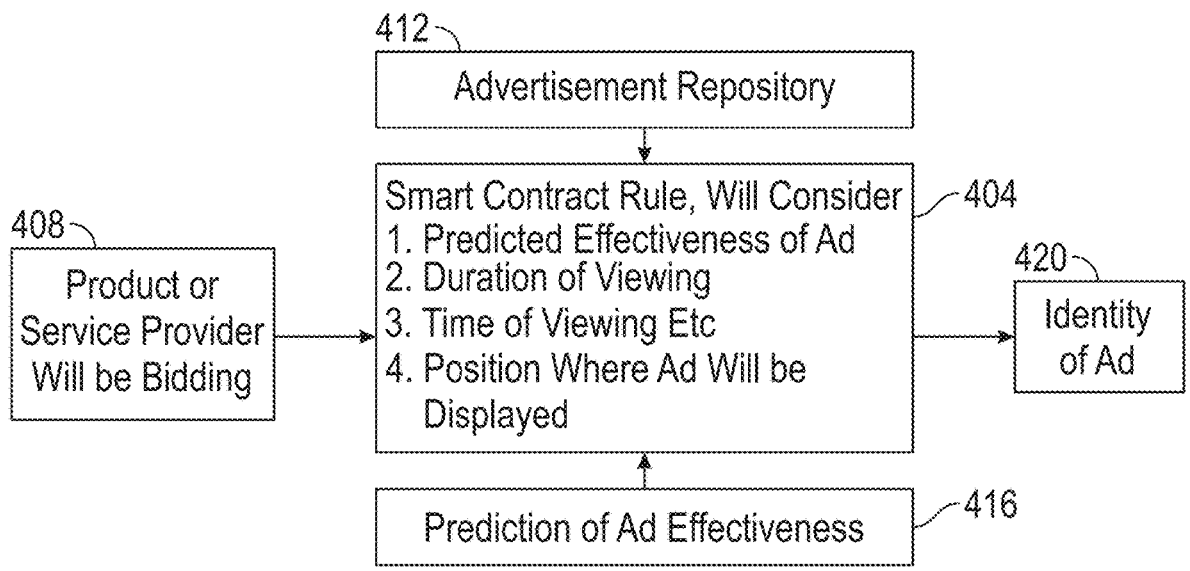
FIG. 4 illustrates a workflow for using a smart contract rule to determine the appropriate placement of an advertisement based on bidding, in accordance with an example embodiment.

FIG. 4 illustrates a workflow for using a smart contract rule 404 to determine the appropriate placement of an advertisement based on bidding, in accordance with an example embodiment. The smart contract rule is used to dynamically determine and control the display of content on the display screen. Criteria for the smart contract rule 404 includes, for example, 1) the predicted effectiveness of the corresponding ad; 2) the duration of viewing of the ad; 3) the time of viewing of the ad; and 4) the position where the ad will be displayed. The inputs to the smart contract rule 404 include an advertisement from, for example, an advertisement repository 412; a bid from, for example, a product or service provider 408; and the predicted effectiveness of the corresponding advertisement 416. The smart contract rule 404 is evaluated based on the inputs and criteria and the result 420 identifies the content to be displayed on the electronic display screen. By way of example, a smart contract rule may specify to refrain from showing conflicting ads to the same group of viewers within a short period of time. This enables, for example, a smooth continuation of advertisements for a specific cluster of viewers. Thus, the advertisements to be selected by the AI system, as constrained by the smart contract rule, may not always be the one with the highest bidder.

Figure 5B:
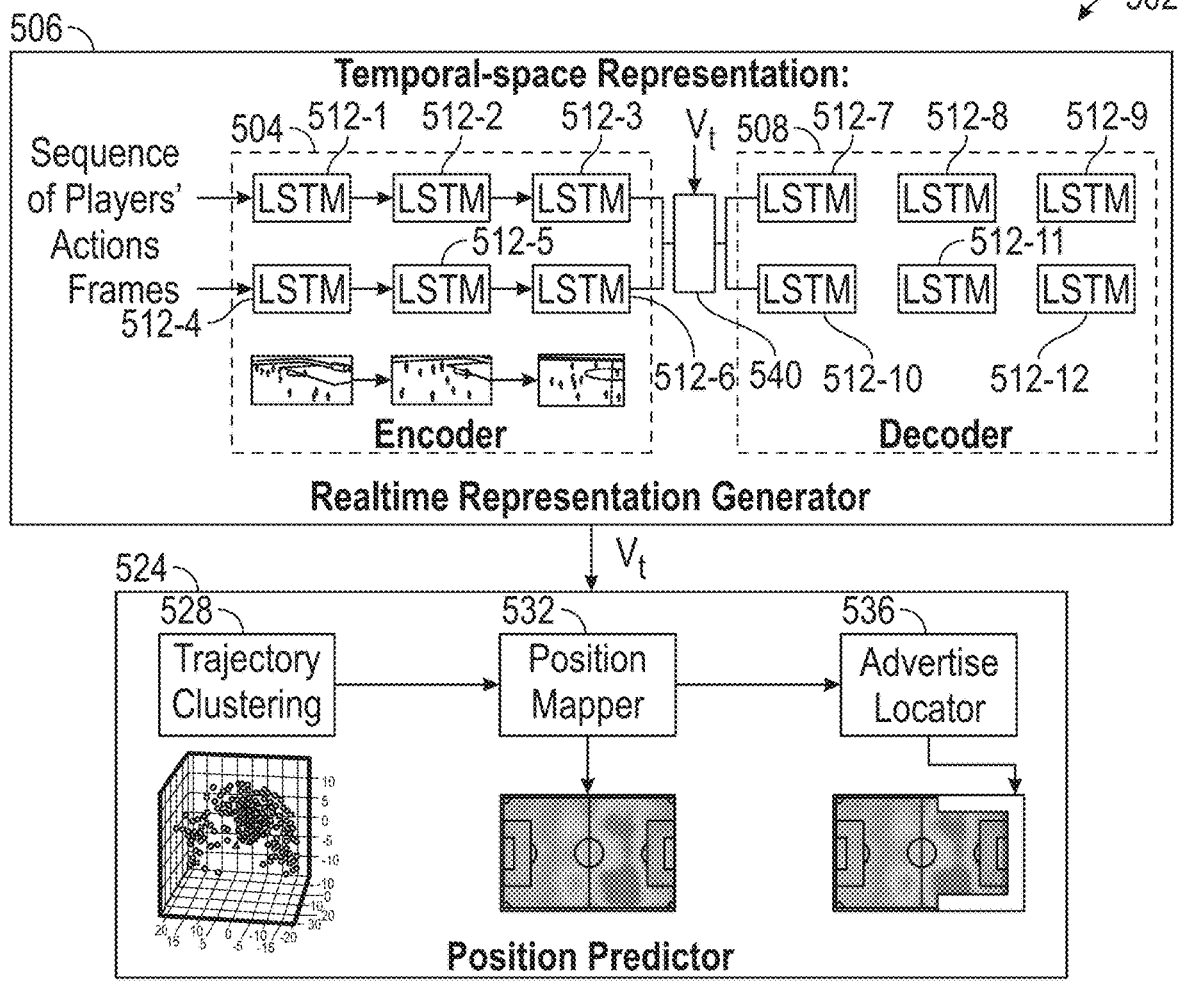
FIG. 5B illustrates an artificial intelligence (AI) system for predicting the movement of a key focus area and calculating the effectiveness score of an advertisement in different classified areas of the display screen, in accordance with an example embodiment.
Figure 5A:
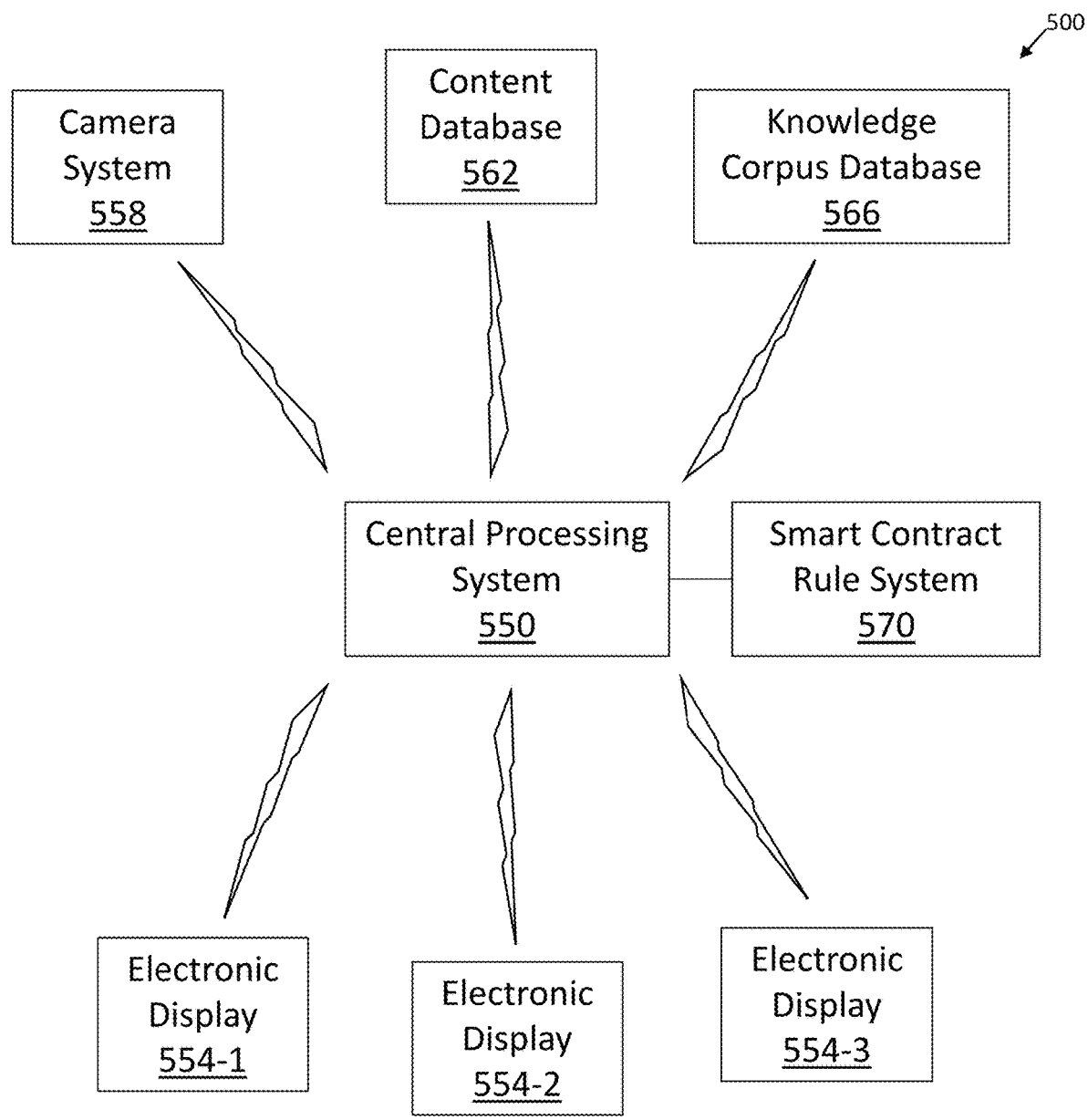
FIG. 5A is a block diagram for an example electronic display system, in accordance with an example embodiment.

FIG. 5A is a block diagram for an example electronic display system 500, in accordance with an example embodiment. In one example embodiment, a central processing system 550 interacts with a smart contract rule system 570 to identify content from a content database 562 to be displayed on one or more of the electronic displays 554-1, 554-2, 554-3 (also referred to as an electronic display screen herein). The central processing system 550 utilizes images from a camera system 558 and knowledge from the knowledge corpus database 566 to, for example, determine the locations of the POIs and the placement of the content on the electronic displays 554-1, 554-2, 554-3.

FIG. 5B illustrates an artificial intelligence (AI) system 500 for predicting the movement of a key focus area and calculating the effectiveness score of an advertisement in different classified areas of the display screen, in accordance with an example embodiment. Based on the predicted effectiveness of the ad in different classified areas of the screens, the smart contract rules direct the placement of the ad on the display screen.

In one example embodiment, a cluster of players' trajectories is predicted using a trained long short-term memory (LSTM) autoencoder 504 of a real-time representation generator 506. The LSTM autoencoder 504 resides on the central processing system 550 and is composed by modules 504, 540 and 508, which includes LSTM units 512-1, 512-2, 512-3, 512-4, 512-5, 512-6 for the Encoder network (504) and the decoder network (508), that generates a temporal-space representation 540. A recurrent neural network (RNN) is used in both models (504 and 508) is able to process a sequence of arbitrary length (for example, a time window of t seconds) by recursively applying a transition function to its internal hidden state vector $h_t$ of the input sequence (a series of frames from real-time cameras). The activation of the hidden state $h_t$ at time step t is computed as a function $f$ of the current input frame $e_t$ and the previous hidden state $h_{t-1}$. It is common to use state-of-the-art transition functions $f$ as the composition of an element-wise nonlinearity with an affine transformation of both $e_t$ and $h_{t-1}$. Given a sequence of frames, hidden state information, i.e., $h_t$, $h_{t-1}$, can be considered as the elements of the RNN.

In the task of trajectory prediction, the input sequence of frames and player actions are mapped to a fixed-sized vector representation using an RNN, a representation for the actions in a given time window is created, and clustering is applied to the compressed representation vector (Vt). Given a series of frames $e=\{e_0, e_1, e_2, \ldots, e_T\}$, a lookup layer is first used to obtain the representation vector/embedding for each frame and actions ($e_t$). The output at the last moment $h_T$ can be regarded as the representation of the whole sequence of actions and frames during the last t seconds. With the compressed representation ($V_t$), the position cluster of the players is calculated in real time and those are mapped to the soccer field by position predictor 524, a component of the central processing system 550. After the mapping is done, a position predictor estimates the location and amount of time for the advertisement to be displayed.

It is worth noting that cameras can be connected with the central processing component either with wired or wireless connections. In one or more embodiments, the central processing component has access to the ads/content database and knowledge corpus (e.g., previous experience). In one or more embodiments, the prediction inference and smart bidding system are AI-based components, with access to the feeds from multiple cameras and/or other sources and databases (ads/content and knowledge corpus).

In one example embodiment, the AI system 502 of the EDS 500 is trained to detect the current location and predict a future location of the key focus area. The tasks of the AI system 502 may be implemented on a server, in the cloud, and the like. For example, resource intensive tasks such as video-based processing, tracking and clustering of the trajectory of key focus areas can be implemented on the central processing system 550, in the cloud, and the like.

In one or more embodiments, the AI system 500 provides the advertising/content locations in real-time using stadium cameras to the smart contract rule system 404, so the system can bid on highly relevant advertise/content spots accordantly.

The AI system 502 analyzes historical information, such as video recording of a sporting event in an arena, and the current condition of the sports being played. The AI system 502 extracts frames from a video stream and then extracts and identifies the sports persons (such as players), gaming objects (such as ball), and the like in the frame. In one example embodiment, each and every frame is analyzed. The current condition of the sports being played are represented, for example, by the current input frames in FIG. 5B, such as an attack session by one of the playing teams.

In one example embodiment, the AI system 502 predicts the key focus area based, for example, on crowdsourced camera direction movement on the sport ground and image analysis. Crowdsourced camera implies using multiple cameras that are recording the ongoing sport activity at different locations and field-of-views. In one example embodiment, the camera has a compass and/or directional sensor to identify the direction of the area of focus from the perspective of the camera. The AI system 502 receives directional feeds from the camera and determines where the camera is focused. Using data analysis, a video analysis module also identifies the key focus points of a member of the audience, the key focus points of a player, a reaction of a player, a movement of a gaming object, and the like. In one example embodiment, the cameras are embedded with directional sensors and the directional feed come from these sensors.

A reaction of a player results in an indication of the direction of movement (forward, backward, and the like) that can be used to infer whether the team is attacking or defending. Viewers are clustered and each cluster of viewers are monitored and their data is analyzed accordingly. Viewers sitting in different locations will be clustered into different clusters and their display units are potentially configured differently and, hence, the different clusters of viewers see different ads at a given time. In instances without a dedicated display for a cluster, a display unit can be shared across different viewers in different locations by extrapolating the electronic displays, i.e., apportioning different areas of the electronic display to different clusters of viewers based on the field-of-views of the clusters. The electronic displays may be used to display strictly advertisements, strictly sports content, other content or any combination of the above. The prediction of where the soccer ball will go next is a common anticipation problem after the ball is, first, detected and, then, tracked. In one example embodiment, the AI system 502 analyzes historical sports videos to identify players and predicts how the point of attraction is moving, based on the preceding movement of the point of attraction and identifies the background display areas.

In one example embodiment, the AI system 502 utilizes the smart contract rule in conjunction with the current advertisement effectiveness score and the predicted advertisement effectiveness score to determine the location of the content on the display screens. The AI system 502 analyzes historical information, such as video programming, for various sports and the current condition of the sports being played, and proactively identifies different display area(s) where the viewing will be most effective. Advertisers are thus able to perform real-time bidding for advertising space based on the predicted advertisement effectiveness score and, accordingly, the advertising, and the location of the advertising, is dynamically changed based on the smart contract rule. The condition of the sport includes the phases of the game, such as the start, any breaks and the final minutes. Moreover, other conditions, such as attacking, defending, and celebrating are inferred using group-level activity understanding. In one example embodiment, the effectiveness score is determined using a machine learning algorithm that was trained from previous sport activity and advertisement history. In one example embodiment, the condition of a sport is the detection of the event "about to score a goal" and, hence, a detection of audience excitement, key players playing very well, sound from the audience, and the like.

In one example embodiment, the AI system 502 ensures that the appropriate ads are displayed on the display screen(s) based on the smart contract rule and the bidding condition (such as the bidding results between an advertising service provider and an advertiser). The display of content on the display screen is enforced by the smart contract rule.

In one example embodiment, blockchain is utilized for storing the information so that the trust between the advertiser and product/service provider can be established. In this case, the smart contract rule will have criteria associated with:
  ads and associated metadata;
  predicted level of effectiveness;
  predicted duration of ads viewing; and
  predicted timing of showing the ads.

In one example embodiment, the blockchain is used to store various types of information from the product/service provider, including the characteristics of the bidding strategy, such as at what time/stage of the game the advertisement is to be displayed, for which cluster of viewers the advertisement is to be displayed, and how much was paid for displaying the advertisement.

In one example embodiment, a sports video analysis module recognizes the players in the extracted video frame and, using those identities, determines the profiles of the players, obtains the current health condition and historical performance of the players, determines the opposing parties, and the like. In one example embodiment, the sports video analysis module performs the same determinations with the historical sports video analysis. The sports video analysis module also analyzes data from, for example, sports information sites, newspapers, weather sites, and the like.

Image analysis can be utilized during game time for analyzing unfolding events, determining factors such as field conditions, and the like. In addition to image analysis, other modalities, such as acoustic signal analysis (to encode the noise levels of the crowd) and inertial measurement units (such as accelerometers and seismographs) can be employed. Existing algorithms to extract features using acoustic signal processing (e.g., Mel Cepstral Coefficients (MFCC) and time-series inertial measurements (e.g., frequency-time characteristics)) may be employed and off-the-shelf machine learning algorithms can be trained with outcomes related to the dynamics of the crowd.

In one example embodiment, a knowledge corpus is created and a corpus of key focus object movement (a portion of the knowledge corpus that includes a history of the movement of the POI in a sport activity which can be utilized to predict the POI in a current sport activity) on the ground is created considering various factors (by, for example, a sports video analysis module). The locus of the key focus object is identified by analyzing each and every video frame and identifying the key focus in each frame. The knowledge corpus stores all the key details in a particular sport activity, e.g., sport played, viewer locations and viewer clusters, stage of the activity, ads proposed for bidding, bids selected using the smart contract rule(s), and feedback from the viewers, advertisers, and the like. The AI system 502 uses this knowledge to provide more effective systems for ads bidding, selection and display in future sport activities. For example, in a 90 minute sports video, the point of interest will be moving from time to time in the video (the number of frames in the 90 minute video will be=90×60×20, based on a frame rate of 20 per second).

When a sport is being played, the current location of the key focus area will be identified on the field and then, based on the knowledge corpus, various other parameters will be considered (like weather, player, opponent, health condition, and the like) and the locus of the key focus area will be predicted. The details regarding the players, opponent activities and health conditions are used to narrow down the search space for the point of interest. For example, if a player is attacking and the opposing team is collectively defending a goal, it suggests that the point of interest might be near the goal of the opposing team. The knowledge corpus also has the statistics and history of each player, and hence the activities of the player can be anticipated based on the data in the corpus and the players' current health conditions. In one example embodiment, the location of the key focus area will be determined 10 seconds in advance of the POI moving to the predicted location.

A prediction engine predicts the speed of movement of the key focus area based on the past trajectory of the key focus area. If the predicted speed of the key focus area is more than a threshold limit, then image-based ads will be shown so that members of the audience can view the ads while they change their gazes as they track the key focus area. In one example embodiment, if the predicted speed of the key focus area is less than a threshold limit, then a video-based advertisement or an advertisement that is otherwise to be displayed on the background display screen for an extended period of time (such as a video) is displayed. The AI system 502 also identifies the position of the key focus area on the ground (i.e., the nearby display unit) and its distance and direction from various clusters of viewers.

Figure 6:
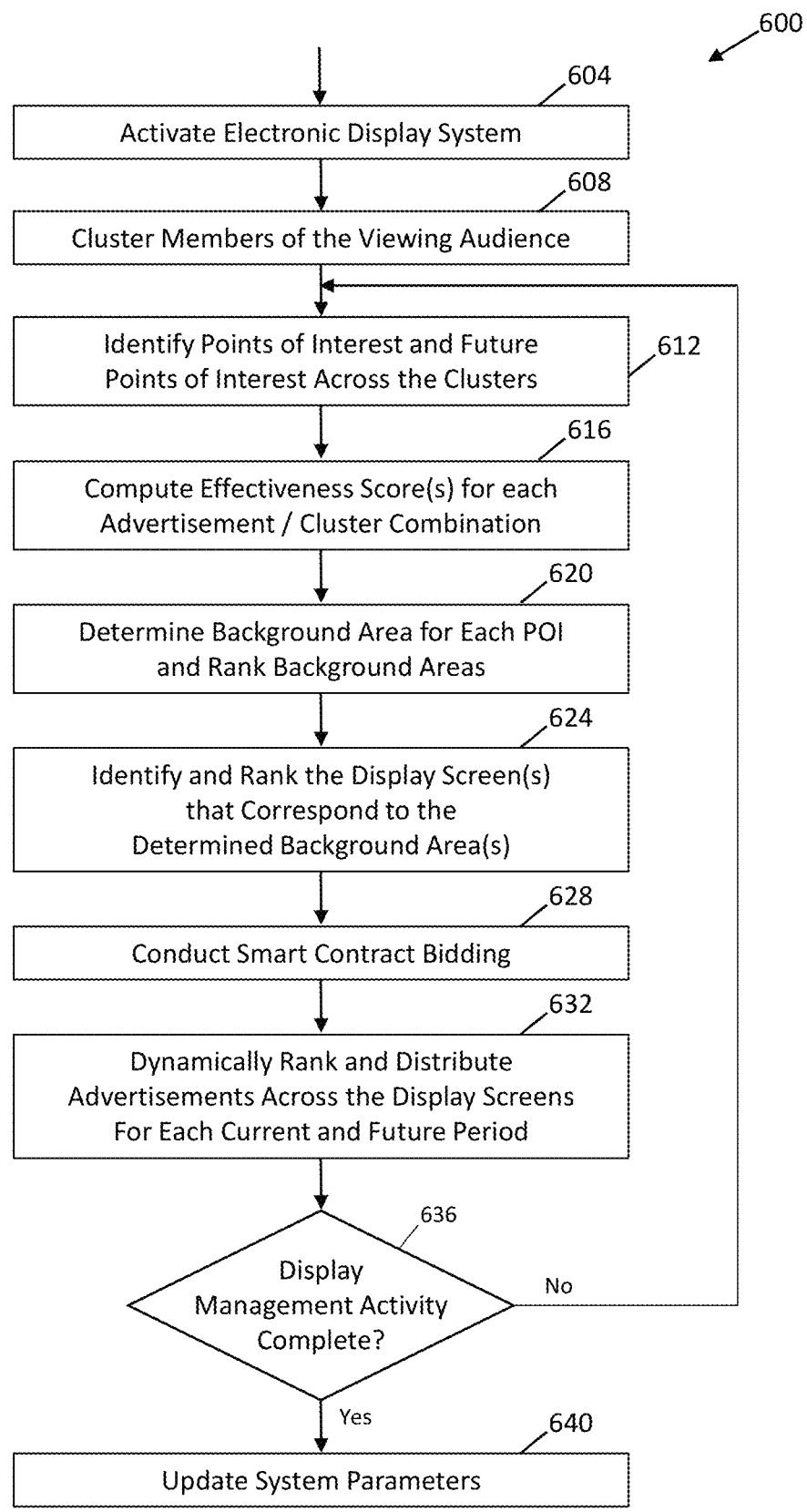
FIG. 6 is a flowchart for an example method for detecting, tracking and predicting a POI and controlling an electronic display system, in accordance with an example embodiment.

FIG. 6 is a flowchart for an example method 600 for detecting, tracking and predicting a POI and controlling an electronic display system, in accordance with an example embodiment. The operations are performed for each electronic display 554-1, 554-2, 554-3. In one example embodiment, based on a real-time pattern of movement of a POI, the speed and direction of movement of the point of interest is extrapolated to segment the display area based on an advertisement effectiveness score for different clusters of viewers. When an effectiveness score is computed, it is inferred from an advertisement displayed for each view/direction, for the duration of the display, and for the associated number of viewers in that direction (where the direction refers to the field-of-view for a corresponding cluster of viewers). In one aspect, direction is replaced with clusters of viewers, and the effectiveness score of a point of interest on a display unit is evaluated per each cluster of viewers (refer to discussion of operation 616 below). The background areas of the POI and the corresponding display area(s) (which have or will have a higher degree of viewing) will also be extrapolated. The advertisement effectiveness score is based on:

1) how many spectators will be viewing the display area at a given time (estimated crowd viewing);
2) how long the spectators will be looking at the display area at a given time;
3) the size of the display area;
4) the speed of movement of the POI;
5) the distance between a given spectator and the electronic display;
6) the revenue generated with the advertisement; and
7) the estimated time of stay of the POI by the electronic display.

In one example embodiment, computer vision algorithms for detecting and tracking objects are employed to estimate the speed of movement of the POI. The distances between the electronic display and different clusters of viewers can be obtained since the locations of viewers and the display units are stationary in the stadium. In one example embodiment, these parameters are estimated on-the-fly by taking into consideration the camera characteristics, such as the focal length. Other parameters, e.g., revenue generated may be automatically extracted from the sum of bids collected over the course of the action and selected by the smart bidding system.

In one example embodiment, the EDS is activated (operation 604). Members of the viewing audience are clustered using a plurality of sources (operation 608). Given the teachings herein, the skilled artisan will be able to adapt known techniques to implement segmentation of the crowd in images. In one example embodiment, the clustering of the viewers takes into consideration specific viewer characteristics, such as home, away and neutral fans (as indicated, for example, by the color of clothing); player areas; expensive and inexpensive seats, and the like.

The current points of interest and future points of interest are identified for each of the viewer clusters (operation 612). Depending on the sport activity, different objects can be the point of interest, e.g., the ball in football, puck in hockey, base runner in baseball, a particular player or a referee. If there are a plurality of POIs, the POI and their corresponding background areas could be ranked and the one with the highest ranking order will be given priority in determining the smart advertisement. For example, the background areas and the corresponding electronic displays may be ranked based on viewership, advertising revenue, and the like. Continuity and smooth transitions of ad content is maintained to manage the POIs and the corresponding screens (electronic displays). For each combination of POI and viewer cluster, the AI system 502 maintains an identifier for the combination and the identity of the corresponding electronic display.

The effectiveness score for displaying a given advertisement at a given electronic display is computed is computed by tracking the POA's position, speed, and direction (operation 616). The effectiveness score is computed using a simple logistic regression that weights its sub-components (position, speed, direction of each POA, duration of the advertisement, and the advertisement's associated number of viewers). Moreover, the following information is determined for use in computing the effectiveness score:

1) how many spectators will be viewing the display area at a given time (estimated crowd viewing);
2) how long the spectators will be viewing the display area;
3) the size of the display area;
4) the distance between a given spectator and the display screen;
5) the revenue generated with the corresponding advertisement; and
6) the estimated time of stay around the POI by the electronic display.

The number of spectators that are or will be viewing a particular display area is estimated, for example, by mapping the number of viewers in each cluster and their proximity and direction to the static electronic display units on-the-fly using computer vision algorithms that take into consideration the structure of the stadium and characteristics of the camera systems. Then, the detection, tracking and prediction of the POI is used to estimate how long a particular cluster of viewers will see the ad on its corresponding electronic display unit. Given the teachings herein, the skilled artisan will be able to adapt known techniques to estimate future activities from past events using, for example, temporal models, such as recurrent neural networks.

The background area for each POI is determined and ranked based on its visibility from different directions (operation 620). In one example embodiment, the background areas are identified by the ads server. Once the position of the predicted key focus area is identified, the position of the background of the predicted key focus area is identified. In one example embodiment, the position of the background of the predicted key focus area is identified for each and every cluster of viewers. The position of the predicted key focus area is measured from all of the different clusters of viewers, and the position of the broadcasting cameras from different positions is identified. Using simple geometrical calculations, the position of the relevant background display screen is identified for each key focus area and viewer cluster. Based on the position of the predicted key focus area(s), the key focus area and associated background area for each broadcast camera is identified. In one example embodiment, the background is estimated from the trajectory of the key focus area, the available display units, and the centroid of each cluster of viewers. In one example embodiment, the detection, tracking and prediction of the key focus area guides the use of the broadcast camera.

The display screen(s), or portion(s) of the display screen(s), that correspond to the background areas are identified and ranked (operation 624). The display areas are ranked based on the effectiveness of the location of the display screen in presenting content to each viewer cluster and the corresponding effectiveness of the advertisement. The AI system 502 knows, for each predicted time, when and where the key focus area will be and proactively selects and displays the appropriate ads such that the audience can view the appropriate advertisement in the background when the key focus area is moved to that area. In one example embodiment, the display screen and ranking are based on the effectiveness score that was computed for each given ad to be displayed at a corresponding display unit for a particular cluster of viewers.

In one example embodiment, smart contract bidding is conducted (operation 628). In one example embodiment, blockchain technology is utilized for information exchanged between, for example, the electronic display system 500 and a user of the electronic display system 500, such as an advertiser. In one example embodiment, the smart contract bidding is conducted in real-time; the bidding is automated and the bidding and the fulfillment of the bidding results consider the computation time allotted to the bidding and performance of the advertisement fulfillment. Computing services, e.g., cloud services, may be employed to facilitate the processing. The delay due to the smart bidding procedure is in the acceptable delay range of digital transmission. In addition, the disclosed techniques reduce the computation burden, e.g., use past events and advertising history to infer events for the current sport activity, thereby resulting in a smaller data requirement and manageable computation time to conduct the bidding operation.

Once a strategic area is predicted, then the AI system 502 determines the POI in a data driven matter or predicts the likelihood that an area is a "key focus" area and initiates bidding. In the data driven approach, the POI is predicted based on neural networks trained using various data sets. For example, a neural network can be trained to predict a future POI based on a history of past POIs, and a neural network can be trained to predict a current POI based on a history of past POIs and the position of players, the position of game balls, and the like. In one example embodiment, probabilistic estimation is performed to determine the "likehood" that a given location is a POI.

The service providers, product manufacturers, and the like can view the predicted focus areas in a proactive manner and cast their bidding amount. In one example embodiment, this operation is performed a priori from the rules and phases of a particular sport activity and a few key focus areas are inferred during the activity in real time. Based on the bidding amount(s), the ads server proactively displays the ads. For example, the ad(s) corresponding to the highest bid(s) may be displayed on the display screens receiving the highest viewership during the specified time period of the bid. In another example, an ad is selected based on the player who is currently controlling the ball. For example, an ad for a brand endorsed by the controlling player may be displayed.

The content, such as advertisements, is then dynamically ranked and distributed across the electronic display screens for each current and future time period, based on the bidding results (operation 632). As described above, in one example embodiment, the content is dynamically ranked according to the results of the bidding and the corresponding display unit for a particular cluster of viewers is determined based on their proximity and direction to the electronic display and the trajectory of the POI.

A check is then performed to determine if the display management activity is complete (decision block 636). If the activity is not complete (NO branch), the method 600 proceeds with operation 612.

It is noted that during certain activities and/or in certain embodiments, the cluster(s) of viewers and POIs will not change often or will not change sufficiently to impact the viewing of the content. In such instances, the recursive loop is changed to proceed with operation 616 (instead of operation 612) to minimize computation time, computation complexity, delay or any combination thereof.

If the activity is complete (YES branch of block 636), the system parameters are updated (operation 640). For example, parameters related to an advertisement, a sport activity, user's feedback, and the like are updated. This is a direct update of the parameters stored in the knowledge corpus by the new parameters from the latest activity. The key parameters for the viewers, the ads, the corresponding display unit, duration and time of display, and revenue generated are saved in the corpus. In one example embodiment, this is used to guide future smart bidding processes having a similar context.

Given the discussion thus far, it will be appreciated that, in general terms, an exemplary method, according to an aspect of the invention, includes the operations of clustering members of an audience of a visually dynamic event using a plurality of sources (operation 608); identifying a current point of interest 340 of the visually dynamic event and a future point of interest 340 of the visually dynamic event across the member clusters (operation 612); computing an effectiveness score for a given content and a given member cluster for the future point of interest 340 by tracking a position, a speed, and a direction of movement of the current point of interest 340 (operation 616); determining and ranking a location of a background area 348A, 348B, 348C, 348D for each member cluster based on the future point of interest 340 (operation 620); identifying and ranking one or more electronic display screens 554-1, 554-2, 554-3 that correspond to the ranked background areas 348A, 348B, 348C, 348D (operation 624); and distributing content across the one or more electronic display screens 554-1, 554-2, 554-3 for each time period based on the ranked display areas (operation 632).

In one example embodiment, smart contract bidding for placement of given content on ranked display areas is conducted. In one example embodiment, given content is dynamically ranked based on bidding results (operation 632). In one example embodiment, one or more system parameters are updated in response to completing the distribution of content (operation 640). In one example embodiment, criteria for bidding is a combination of one or more of: a path of a predicted movement of the POI 340 of the visually dynamic event, a predicted viewing duration, a time of display of given content, a location of the electronic display screens 554-1, 554-2, 554-3, a display area on the electronic display screens 554-1, 554-2, 554-3, a size of a corresponding member cluster who can view the electronic display screens 554-1, 554-2, 554-3, a prediction of a game changing situation, and an effectiveness of displaying given content.

In one example embodiment, video-based content is displayed if a speed of a corresponding POI 340 from a given viewing direction is greater than a threshold limit and image-based content is displayed if a speed of a corresponding POI 340 from a given viewing direction is not greater than a threshold limit. In one example embodiment, a prediction of a POI 340 is based on a position, a speed and a direction of movement of a current POI 340 and wherein a determination of a location of given content includes extrapolating a background area 348A, 348B, 348C, 348D of the predicted POI 340 for a given member cluster. In one example embodiment, criteria for a smart contract rule 404 includes a predicted effectiveness of a corresponding advertisement and a duration of viewing the corresponding advertisement.

In one example embodiment, a location of a key focus area 340 is based on movement of crowdsourced cameras 558. In one example embodiment, an advertisement effectiveness score is based on a size of a corresponding member cluster; a duration of the corresponding member cluster viewing the advertisement; and a size of a display area.

In one aspect, a computer program product for federated learning comprises a computer readable storage medium having program instructions embodied therewith, the program instructions executable by a computer to cause the computer to cluster members of an audience of a visually dynamic event using a plurality of sources (operation 608); identify a current point of interest 340 of the visually dynamic event and a future point of interest 340 of the visually dynamic event across the member clusters (operation 612); compute an effectiveness score for a given content and a given member cluster for the future point of interest 340 by tracking a position, a speed, and a direction of movement of the current point of interest 340 (operation 616); determine and rank a location of a background area 348A, 348B, 348C, 348D for each member cluster based on the future point of interest 340 (operation 620); identify and rank one or more electronic display screens 554-1, 554-2, 554-3 that correspond to the ranked background areas 348A, 348B, 348C, 348D (operation 624); and distribute content across the one or more electronic display screens 554-1, 554-2, 554-3 for each time period based on the ranked display areas (operation 632).

In one aspect, an apparatus comprises a memory; and at least one processor, coupled to said memory, and operative to perform operations comprising clustering members of an audience of a visually dynamic event using a plurality of sources (operation 608); identifying a current point of interest 340 of the visually dynamic event and a future point of interest 340 of the visually dynamic event across the member clusters (operation 612); computing an effectiveness score for a given content and a given member cluster for the future point of interest 340 by tracking a position, a speed, and a direction of movement of the current point of interest 340 (operation 616); determining and ranking a location of a background area 348A, 348B, 348C, 348D for each member cluster based on the future point of interest 340 (operation 620); identifying and ranking one or more electronic display screens 554-1, 554-2, 554-3 that correspond to the ranked background areas 348A, 348B, 348C, 348D (operation 624); and distributing content across the one or more electronic display screens 554-1, 554-2, 554-3 for each time period based on the ranked display areas (operation 632).

Figure 7:
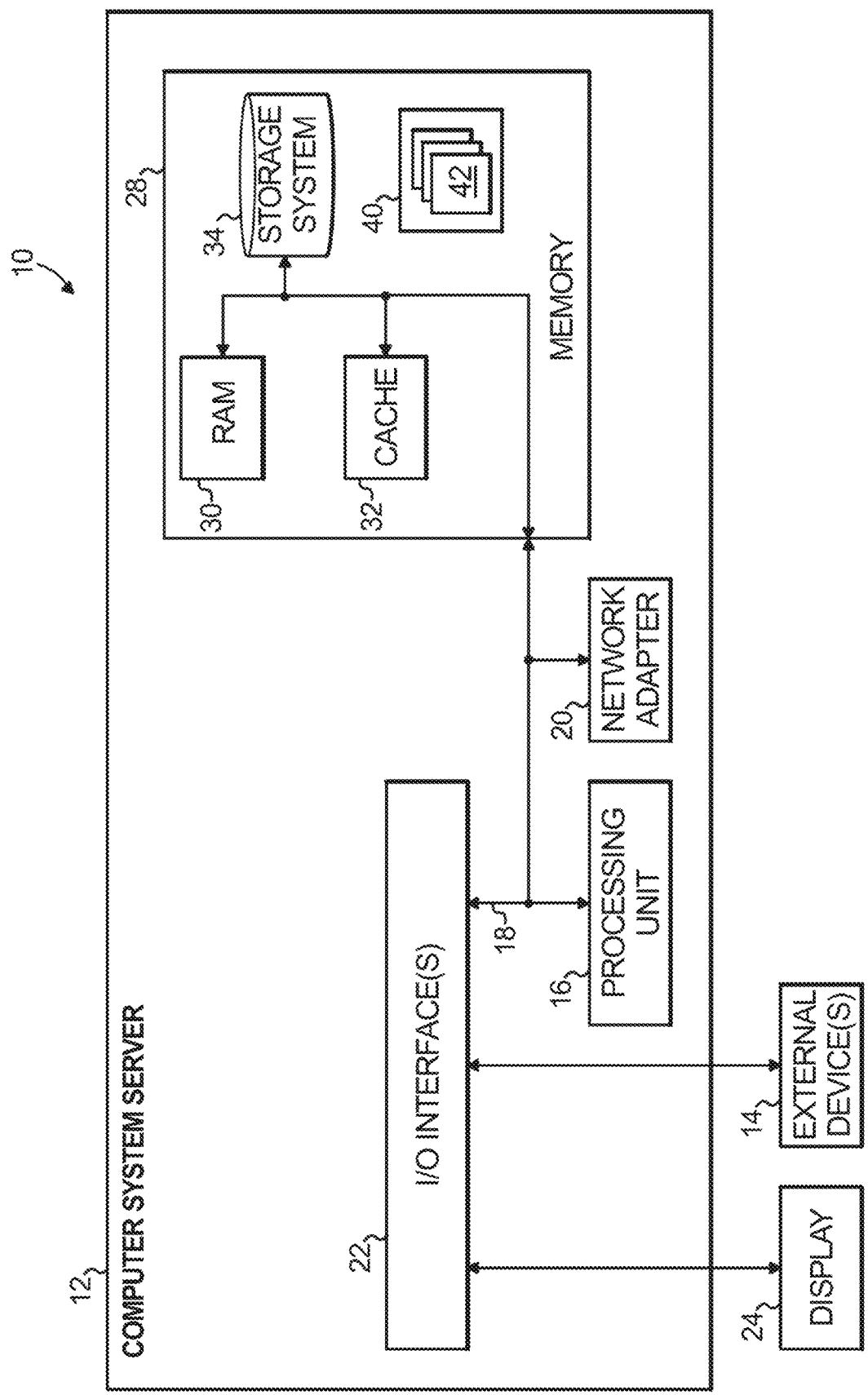
FIG. 7 depicts a computer system that may be useful in implementing one or more aspects and/or elements of the invention, also representative of a cloud computing node according to an embodiment of the present invention.

One or more embodiments of the invention, or elements thereof, can be implemented in the form of an apparatus including a memory and at least one processor that is coupled to the memory and operative to perform exemplary method steps. FIG. 7 depicts a computer system that may be useful in implementing one or more aspects and/or elements of the invention, also representative of a cloud computing node according to an embodiment of the present invention. Referring now to FIG. 7, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 7, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 7) running a server program. It will be understood that such a physical server may or may not include a display and keyboard.

One or more embodiments can be at least partially implemented in the context of a cloud or virtual machine environment (e.g., electronic display controller 96), although this is exemplary and non-limiting. Reference is made back to FIGS. 1-2 and accompanying text.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   clustering members of an audience of a visually dynamic event using a plurality of sources;
   identifying a current point of interest of the visually dynamic event;
   determining a future location of the current point of interest of the visually dynamic event for each member cluster prior to a movement of the current point of interest to the future location;

computing an effectiveness score for given content and a given member cluster for the future location of the current point of interest by tracking a position, a speed, and a direction of movement of the current point of interest;

determining and ranking a location of a background area for each member cluster based on the future location of the current point of interest;

identifying and ranking one or more electronic display screens that correspond to the ranked background areas based on the effectiveness score; and distributing the given content across the one or more electronic display screens for each time period based on the ranked display screens.

2. The method of claim 1, further comprising conducting smart contract bidding for placement of said given content on the ranked display screens.

3. The method of claim 2, further comprising dynamically ranking the given content based on bidding results.

4. The method of claim 1, further comprising updating one or more system parameters in response to completing the distribution of the given content.

5. The method of claim 1, wherein criteria for bidding is a combination of one or more of: a path of a predicted movement of the future location of the current point of interest of the visually dynamic event, a predicted viewing duration, a time of display of the given content, a location of the electronic display screens, a display area on the electronic display screens, a size of a corresponding member cluster who can view the electronic display screens, a prediction of a game changing situation, and an effectiveness of displaying the given content.

6. The method of claim 1, wherein a prediction of a point of interest (POI) is based on a position, a speed and a direction of movement of the current point of interest (POI) and wherein a determination of a location of the given content includes extrapolating a background area of the predicted point of interest (POI) for a given member cluster.

7. The method of claim 1, wherein criteria for a smart contract rule includes a predicted effectiveness of a corresponding advertisement and a duration of viewing the corresponding advertisement.

8. The method of claim 1, wherein the future location of the current POI is based on movement of crowdsourced cameras.

9. The method of claim 1, wherein an advertisement effectiveness score is based on a size of a corresponding member cluster; a duration of the corresponding member cluster viewing the advertisement; and a size of a display area.

10. A method comprising:
clustering members of an audience of a visually dynamic event using a plurality of sources;
identifying a current point of interest of the visually dynamic event;
determining a future location of the current point of interest of the visually dynamic event for each member cluster prior to a movement of the current point of interest to the future location;
computing an effectiveness score for given content and a given member cluster for the future location of the current point of interest by tracking a position, a speed, and a direction of movement of the current point of interest;
determining and ranking a location of a background area for each member cluster based on the future location of the current point of interest;
identifying and ranking one or more electronic display screens that correspond to the ranked background areas based on the effectiveness score; and
distributing the given content across the one or more electronic display screens for each time period based on the ranked display screens;
wherein video-based content is displayed in response to a speed of a corresponding point of interest (POI) from a given viewing direction being greater than a threshold limit and image-based content is displayed in response to a speed of a corresponding point of interest (POI) from a given viewing direction being not greater than a threshold limit.

11. A computer program product for federated learning, the computer program product comprising a non-transitory computer readable storage medium having program instructions embodied therewith, the program instructions executable by a computer to cause the computer to:
cluster members of an audience of a visually dynamic event using a plurality of sources;
identify a current point of interest of the visually dynamic event;
determining a future location of the current point of interest of the visually dynamic event for each member cluster prior to a movement of the current point of interest to the future location;
compute an effectiveness score for given content and a given member cluster for the future location of the current point of interest by tracking a position, a speed, and a direction of movement of the current point of interest;
determine and rank a location of a background area for each member cluster based on the future location of the current point of interest;
identify and rank one or more electronic display screens that correspond to the ranked background areas based on the effectiveness score; and
distribute the given content across the one or more electronic display screens for each time period based on the ranked display screens.

12. An apparatus comprising:
a memory; and
at least one processor, coupled to said memory, and operative to perform operations comprising:
clustering members of an audience of a visually dynamic event using a plurality of sources;
identifying a current point of interest of the visually dynamic event;
determining a future location of the current point of interest of the visually dynamic event for each member cluster prior to a movement of the current point of interest to the future location;
computing an effectiveness score for given content and a given member cluster for the future location of the current point of interest by tracking a position, a speed, and a direction of movement of the current point of interest;
determining and ranking a location of a background area for each member cluster based on the future location of the current point of interest;
identifying and ranking one or more electronic display screens that correspond to the ranked background areas based on the effectiveness score; and
distributing the given content across the one or more electronic display screens for each time period based on the ranked display screens.

13. The apparatus of claim 12, the operations further comprising conducting smart contract bidding for placement of the given content on the ranked display screens.

14. The apparatus of claim 13, the operations further comprising dynamically ranking the given content based on bidding results.

15. The apparatus of claim 12, the operations further comprising updating one or more system parameters in response to completing the distribution of the given content.

16. The apparatus of claim 12, wherein criteria for bidding is a combination of one or more of: a path of a predicted movement of the point of interest (POI) of the visually dynamic event, a predicted viewing duration, a time of display of the given content, a location of the electronic display screens, a display area on the electronic display screens, a size of a corresponding member cluster who can view the electronic display screens, a prediction of a game changing situation, and an effectiveness of displaying the given content.

17. The apparatus of claim 12, wherein a prediction of a point of interest (POI) is based on a position, a speed and a direction of movement of the current point of interest (POI) and wherein a determination of a location of the given content includes extrapolating a background area of the predicted POI for a given member cluster.

18. The apparatus of claim 12, wherein criteria for a smart contract rule includes a predicted effectiveness of a corresponding advertisement and a duration of viewing the corresponding advertisement.

19. The apparatus of claim 12, wherein an advertisement effectiveness score is based on a size of a corresponding member cluster; a duration of the corresponding member cluster viewing the advertisement; and a size of a display area.

20. An apparatus comprising:
a memory; and
at least one processor, coupled to said memory, and operative to perform operations comprising:
 clustering members of an audience of a visually dynamic event using a plurality of sources;
 identifying a current point of interest of the visually dynamic event;
 determining a future location of the current point of interest of the visually dynamic event for each member cluster prior to a movement of the current point of interest to the future location;
 computing an effectiveness score for given content and a given member cluster for the future location of the current point of interest by tracking a position, a speed, and a direction of movement of the current point of interest;
 determining and ranking a location of a background area for each member cluster based on the future location of the current point of interest;
 identifying and ranking one or more electronic display screens that correspond to the ranked background areas based on the effectiveness score; and
 distributing the given content across the one or more electronic display screens for each time period based on the ranked display screens;
wherein video-based content is displayed in response to a speed of a corresponding point of interest (POI) from a given viewing direction being greater than a threshold limit and image-based content is displayed in response to a speed of a corresponding point of interest (POI) from a given viewing direction being not greater than a threshold limit.

* * * * *